D. PREW.
Railroad-Car Wheels.
No. 133,336.    Patented Nov. 26, 1872.
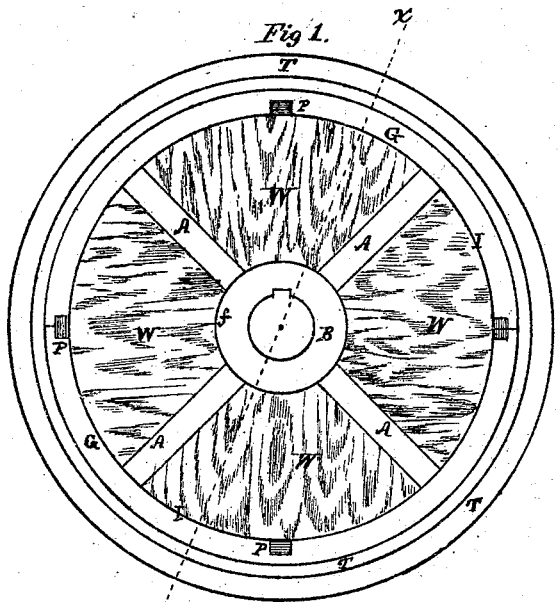
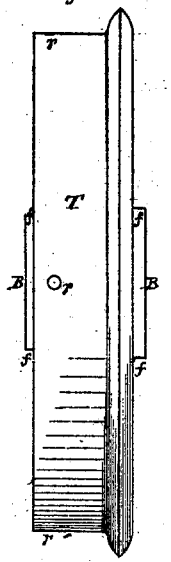
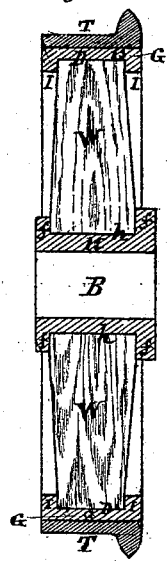
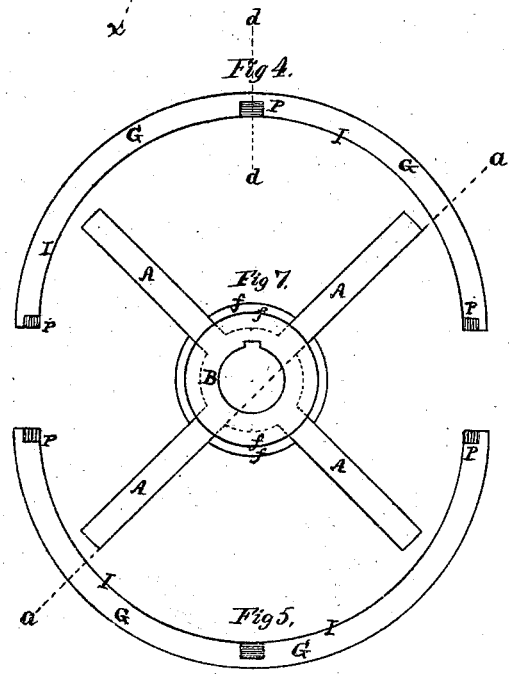
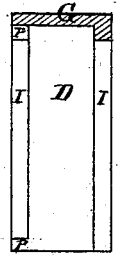
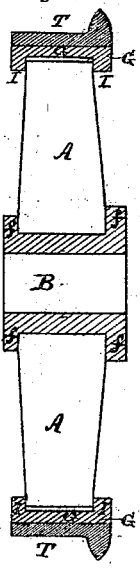
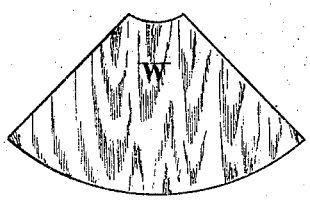
Witnesses:
Isaac A. Brownell
William Brownell
Inventor.
David Prew

UNITED STATES PATENT OFFICE.

DAVID PREW, OF PROVIDENCE, RHODE ISLAND.

IMPROVEMENT IN RAILROAD-CAR WHEELS.

Specification forming part of Letters Patent No. 133,336, dated November 26, 1872.

*To all whom it may concern:*

Be it known that I, DAVID PREW, of the city and county of Providence and State of Rhode Island, have invented a new and Improved Railroad-Car Wheel, of which the following is a specification, referring to the accompanying drawing making part of the same, in which—

Figure 1 is a side elevation of my improved car-wheel. Fig. 2 is a front elevation of the same. Fig. 3 is a cross-section by the line $x\ x$ of Fig. 1. Figs. 4 and 5 show a side elevation of the two parts of the wheel-rim separately. Fig. 6 is a view of the under side of the wheel-rim and a cross-section by the line $d\ d$ of Fig. 4. Fig. 7 is a side view of the metallic hub and arms of the said wheel separately. Fig. 8 is a cross-section of the rim and tire, and of the hub and arms by the line $a\ a$ of Fig. 7; and Fig. 9 is a side view of one of the divisions of the wooden plate W of the wheel separately.

Similar letters mark like parts in all the figures.

My invention relates to making car-wheels partly of metal and partly of wood, with the object of sustaining the wear and and preserving the strength by a proper disposition of the metal, and of reducing the weight and destroying the concussion by a proper disposition of the wood. My invention consists in making the rim and center of the car-wheel of metal and the intervening part, constituting the plate, of wood, substantially as hereinafter described.

As shown in the drawing, the wheel is constructed with a cast-iron hub, B, having two flanges, $f$, at the ends, and with four arms, A, extending therefrom to the rim G. This rim is also of cast-iron formed in two equal parts, Figs. 4 and 5, and has a flange, I, on each side extending inward, as shown in Fig. 3, and the rim is surrounded by a flanged tire, T, of iron or steel shrunk thereon, and, if necessary, further secured by bolts or rivets $r$ passing through both tire and rim, for which openings $p$ are provided in the latter, as shown in Figs. 1 and 6. In the spaces between the arms A and the surfaces $h$ of the hub and D of the rim, between their flanges, the wooden plate W is confined, in four divisions, like that shown in Fig 9, in the manner shown in Figs. 1 and 3, and serves to support the rim and tire radially, and destroy the concussion between the rim and hub of the wheel. The metallic arms A do not have a bearing against the surface D of the rim at their ends; on the contrary, there is a space between the ends of the arms and the surface of the wheel-rim, as shown in Fig. 8, and the arms have a bearing against the flanges I on each side of said rim, by means of which a suitable resistance is afforded to the lateral strain upon the wheel's rim in passing round a curve in the rail-track and the like.

In making said car-wheel but little more labor is required than in making and fitting the ordinary cast-iron wheel; the hub and its arms and the rim G are iron castings; the divisions of the wooden plate can be readily wrought into accurate form by well-known wood-working machinery; and the tire, of iron or steel, is a staple article of commerce, of all required dimensions; from which circumstances it will be seen and understood, in the light of a considerable advantage, that these wheels can be easily and cheaply made and repaired, as well as cars and engines, in the railroad shops, and by the same or similar machinery. It is estimated, also, that at least one-third the weight of the material will be saved, and, what is of greater importance, the cost of the constant transportation of this dead weight, and of the consequent strain and wear upon the other parts of railroad cars, as well as the track and locomotive machinery. Besides which the better effect arising from the interposition of a body of wood between the rim and hub of the wheel, instead of a body of solid iron, as in the ordinary car-wheel, I consider to be of sufficient advantage to recommend its general use.

Having described my invention, I wish it understood that I do not restrict myself to the precise construction herein set forth, as the same can be changed in some respects to effect a still greater saving in the weight of material and to alter the pattern or form of the wheel, all without changing its character—as, for instance, the separate rim G may be changed in form, or, in case of small and light wheels, perhaps dispensed with, and the wrought tire provided with suitable inner flanges, shrunk immediately upon the periphery of the wooden plate; and the arms A may be made hollow or cored out from side to side to form a skeleton arm or frame; and the sectional plate may be in more or less number of sections, and each section be composed of two pieces, one upon each side, or of a single piece hollowed out in the middle, as may be found most desirable for cheapness and lightness, or for the nature of the strain and wear to which the structure is to be subjected.

I claim—

The wheel for railroad cars, constructed with a sectional wooden plate, the sections being interposed between the rim and hub of metal, and between radial arms cast on the hub, such arms supporting the rim laterally, the whole being confined and secured together by shrinking on the tire, substantially in the manner described.

DAVID PREW.

Witnesses:
ISAAC A. BROWNELL,
WILLIAM BROWNELL.